United States Patent Office 2,869,605
Patented Jan. 20, 1959

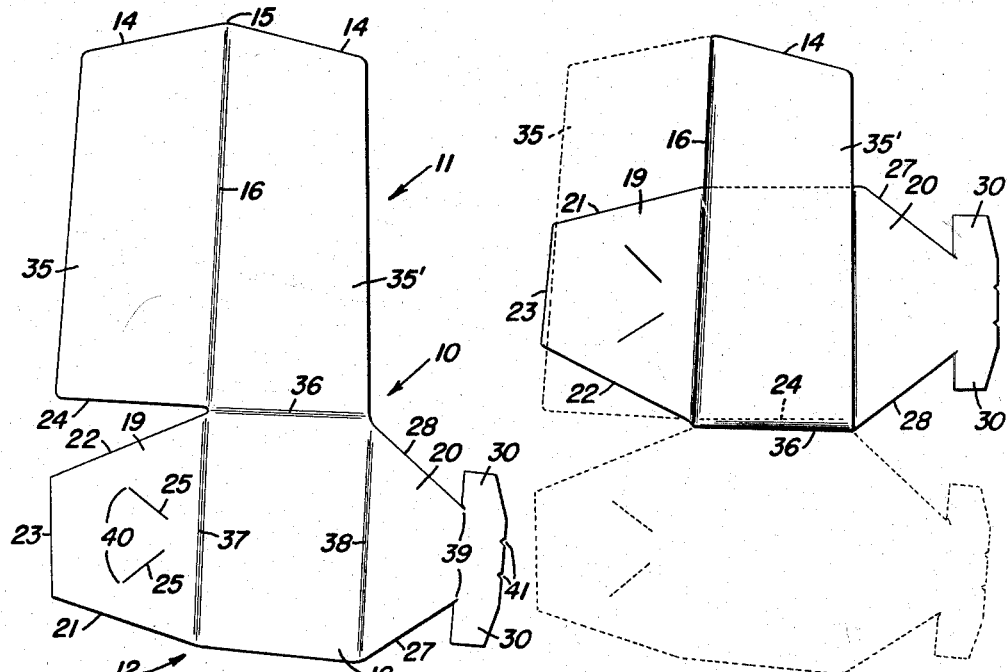

2,869,605
SPECTACLE CASE

Robert G. de Weese, Rochester, N. Y., assignor, by mesne assignments, to Textron Inc., Providence, R. I., a corporation of Rhode Island Application April 5, 1956, Serial No. 576,305

9 Claims. (Cl. 150—52)

The present invention relates to spectacle cases, and more particularly to open-end spectacle cases made of a thin, flexible material, such as soft leather or a synthetic.

Conventional open-end spectacle cases are made of two pieces of leather, or like material, sewn together around three edges, the upper confronting edges of the two pieces being left unsewn to form a mouth for insertion of the spectacle into the case. The sewing does not lend itself to a mass-production operation. Moreover, in the course of time, the thread may rot and unravel. Furthermore, the single thin layer of material, such as leather, of the conventional open-end spectacle case ordinarily affords limited protection against breakage if the spectacle case is dropped with a spectacle in it. For that reason, spectacles having lenses mounted in a metal chassis are ordinarily carried in a hard, closed spectacle case.

One object of the present invention is to provide an open end spectacle case which can be made without stitching.

Another object of the invention is to provide an open end spectacle case which has additional layers of the material, from which it is made, around the spectacle to give additional protection.

Another object of the invention is to provide a spectacle case of the character described which has no clips or tabs or slots on its inside, nothing for the spectacle to catch on.

Another object of the invention is to provide a spectacle case of the character described so formed that it has a slot at one side which allows a person to reach down with his or her fingers far enough to remove the spectacle readily from the case or to push it into the case.

A further object of the invention is to provide a spectacle case of the character described which is so constructed and shaped as to provide a natural hand grip.

Still another object of the invention is to provide a spectacle case which can readily be made of two different colors of leather or other suitable material so as to provide a two-tone effect.

A still further object of the invention is to provide a spectacle case of the character described which will be economical to manufacture.

Other objects of the invention will be apparent hereinafter from the specification and from the recital of the appended claims.

In the drawing:

Fig. 1 is a view of a leather blank such as may be used in making a spectacle case according to one embodiment of this invention;

Fig. 2 is a view indicating in dotted lines the blank and showing in full lines the blank partially folded;

Fig. 3 is a view of one side of the completely folded case;

Fig. 4 is a view looking at the other side of the completely folded case;

Fig. 5 is a view looking at one side edge of the case, the case being shown partly spread open to receive a spectacle;

Fig. 6 is a section on the line 6—6 of Fig. 3;

Fig. 7 is a view of a blank for forming a two-tone spectacle case according to another modification of the invention; and Fig. 8 is a section on the line 8—8 of Fig. 7.

Referring first to the embodiment of the invention shown in Figs. 1 to 6 inclusive, 10 denotes a blank for a spectacle case made according to one embodiment of this invention. This blank comprises two main portions 11 and 12 formed from a single piece of leather or other suitable thin flexible material. The portion 11 is generally trapezoidal in shape but its free end is preferably shaped to have edge portions 14 which converge to an apex 15 that lies on the line of fold, or score line, 16 of this portion. Portion 11 can be folded along line 16 to form the side walls 35 and 35' of the spectacle case.

The portion 12 of the blank has a generally rectangular central section 18 and two wing sections 19 and 20. The blank is slotted so that the wing section 19 is spaced, when the blank is laid out flat as shown in Fig. 1, from the wall portion 35. The wing section 19 has side edges 21 and 22 which converge toward the free edge 23 of this wing section. Edge 22 of the wing section 19 diverges, when the blank is laid flat, from the adjacent edge 24 of wall portion 35. Slits 25 are formed in this wing section 19. These slits converge toward the central section 18 of the blank.

The wing section 20 has converging edges 27 and 28 that converge away from the central section 18. The wing sections 20 terminates in two laterally projecting tabs 30 which are adapted to be engaged in the slits 25 of the wing section 19 when the blank is folded to form the spectacle case.

In forming the spectacle case, the trapezoidal portion 11 of the blank is first folded along the line 16 to form the two equal overlapping wall portions 35 and 35'. Then the blank is folded along the line 36 so that the folded portions 35 and 35' both overlie the central section 18 of the portion 12 of the blank between the wings 19 and 20, as shown in Fig. 2. Then the wing 19 is folded along the line 37 (Fig. 1) over the wall 35'; and then the wing 20 is folded along the line 38 (Fig. 1) to extend over the folded wing 19, and the tongues 30 of wing 20 are inserted into the slits 25 of wing 19 to lock the case in its folded condition (Fig. 3). Notches 39 (Fig. 1) are formed at the junctures of the tongues or ears 30 with the sides 27 and 28 of the wing section 20 to engage lockingly in the ends 40 of the slits 25; and notches 41 formed at the junctures of the outer edges of the tongues or ears 30 with the wing section 20 permit ready entry of the tongues or ears 30 into the slits 25 without bunching up the material.

The height of the wing section 20 along the open side of the folded trapezoidal portion 11 is less than the height of the walls 35, 35' so that an opening 45 is left in the folded case which with the open upper end of the case permits ready insertion of a spectacle into or removal of the spectacle from the folded case. The sloped edges 14 of the walls 35, 35' are inclined downwardly toward the open side 45 of the case to guide the spectacle as it is inserted in the opening.

Instead of making the case in a single piece, as shown in Figs. 1 to 6 inclusive, it may be made in two pieces, as shown in Figs. 7 and 8, stapled together. The piece 11' may be similar in shape to the portion 11 of the case 10 previously described, and the piece 12' may be similar in shape to the portion 12 of the case 10. The two pieces 11' and 12' are stapled or clipped together by wire staples or clips 39 along their contacting edges, as shown clearly in Fig. 8.

The manner of folding the spectacle case of Fig. 7 is the same as that previously described. The portion 11' will be folded along the line 16', and then folded at the juncture 36' of the two pieces. Then the wing 19' will be folded over the folded piece 11' and the wing 20' will then be folded over the wing 19' and the ears or tongues 30' of the wing 20' will be inserted into the slits 25' of wing 19' to lock the case in closed position.

With the structure shown in Figs. 7 and 8, it is possible to make a two-toned case, one piece 11' being made of one color and/or kind of material and the other piece 12' being made of another color and/or kind of material. There will be less wastage of leather with the construction shown in Figs. 7 and 8 than with the construction shown in Figs. 1 to 6 inclusive.

While the invention has been described in connection with two different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A spectacle case comprising a first section and a second section, said first section being folded along a longitudinal line to form two side walls of said case, one of which overlies the other, said second section being folded along two parallel, spaced longitudinally-extending lines to provide a central portion and two wings, said central portion and one of the side walls of said first section being joined together at one end of each, said sections being otherwise disconnected, said sections being folded on each other along the line of juncture of said central portion and said one side wall to form the bottom of said case and so that said central portion overlies said one side wall, said two wings being folded over the other side wall of said first section whereby said second section surrounds said first section, and means for securing said wings together to hold the case in its folded condition.

2. A spectacle case comprising two sections joined together along a transverse fold line, said sections being folded along said fold line to form the bottom of said case, the top of said case being open, one of said sections being folded along a longitudinal line to form who side walls of said case, the other section being folded along two parallel, spaced longitudinally-extending lines to provide a central portion overlying one of said side walls and two wings overlying the other side wall, and means for securing said wings together to hold the case in its folded condition, the height of said other section at the portion which overlaps the free edges of said walls being less than the height of said walls at said edges whereby an opening is provided at one side edge of said case which joins the opening at the upper end of said case.

3. A pectacle case compising two sections joined together along a transverse fold line, said sections being folded along said fold line to form the bottom of said case, the top of said case being open, one of said sections being folded along a longitudinal line to form two side walls of said case, the other section being folded along two parallel, spaced longitudinally-extending lines to provide a central portion overlying one of said side walls and two wings overlying the other side wall, one of said wings having a slit in it, and the other of said wings having a locking tongue which is inserted in said slit to hold the case in folded condition, the height of said other section at the portion which overlaps the free edges of said walls being less than the height of said walls at said edges whereby an opening is provided along said free edges which joins the opening at the upper edge of the case.

4. A spectacle case comprising two sections made, respectively, of different materials, one of said sections being folded along a longitudinal line to form the two side walls of said case which overlie one another, the other section being folded along two parallel, spaced longitudinally-extending lines to form a central portion and two wings, said central portion being joined at one end to one end of the one of said two side walls, said two sections being otherwise separated, the two sections being folded on one another along the line of juncture of said central portion and said one side wall to form the bottom of said case, said case being open at its top, said other section being wrapped around said side walls, and means for securing said other section in its wrapped-around position.

5. A spectacle case comprising two sections of different materials, respectively, one of said sections being folded along a longitudinal line to form the two side walls of said case which overlie one another, the other section being folded along two spaced, parallel, longitudinally-extending lines to provide a central portion and two wings, said central portion being joined at one end to one end of one of said two side walls, said two sections being otherwise separated, the two sections being folded on one another along the line of juncture of said central portion and said one side wall to form the bottom of said case and so that said central portion overlies said one side wall, said two wings being folded over the other side wall, one of said wings having a slit in it, and the other of said wings having a locking tongue which is inserted in said slit to hold the case in folded condition, said case being open at its top.

6. A spectacle case as claimed in claim 4, in which the maximum height of said wrapped around portion, at the free edges of said walls, is less than the height of said side walls at said free edges, whereby an opening is provided at one side edge of the case that joins the opening at the top of the case for ready insertion into and removal of a spectacle from the case.

7. A spectacle case according to claim 5 in which the height of said other section at the portion thereof, which overlaps the free edges of said walls, is less than the height of said walls at said free edges, whereby an opening is provided along said free edges which joins the opening at the top of said case, and which permits ready insertion into or removal from the case of a spectacle.

8. A spectacle case comprising a single piece of thin flexible material formed in two main sections, one of said sections being folded along a central longitudinal line to form two side walls of the case, one of which overlies the other, the other section being folded along parallel, spaced longitudinally-extending lines to provide a central portion and two wings, said two sections being joined together only at the adjacent ends of said central portion and one side wall and being folded upon one another at said juncture to form the bottom of said case and so that said central portion overlies said one side wall, said wings overlying the other side wall, whereby said other section is wrapped around said one section, and means for securing said other section in its wrapped-around position, said case being open at its top.

9. A spectacle case according to claim 8 in which the maximum height of the wrapped-around section, at the portion thereof which overlaps the free edges of said walls, is less than the height of said walls at said free edges, whereby an opening is provided along said free edges which joins the opening at the top of the case, and which permits ready insertion into and removal from the case of a spectacle.

References Cited in the file of this patent

UNITED STATES PATENTS

| | | |
|---|---|---|
| 840,661 | Rood | Jan. 8, 1907 |
| 1,648,612 | Evans | Nov. 8, 1927 |
| 1,731,996 | Appelbaum | Oct. 15, 1929 |
| 2,498,202 | Dingman | Feb. 21, 1950 |
| 2,725,914 | Daum | Dec. 6, 1955 |
| 2,758,707 | Baratelli | Aug. 14, 1956 |